ULTRA-LONG MONOSTABLE MULTIVIBRATOR EMPLOYING BISTABLE SEMICONDUCTOR SWITCH TO ALLOW CHARGING OF TIMING CIRCUIT
Filed April 19, 1961

INVENTORS
JUSTIN C. SCHAFFERT
JOHN N. LIBBY
BY G. W. O'Brien
Richard J. Keegan
ATTORNEYS

United States Patent Office 3,085,165

Patented Apr. 9, 1963

3,085,165

ULTRA-LONG MONOSTABLE MULTIVIBRATOR EMPLOYING BISTABLE SEMICONDUCTOR SWITCH TO ALLOW CHARGING OF TIMING CIRCUIT

Justin C. Schaffert, Annandale, Va., and John N. Libby, Takoma Park, Md., assignors to the United States of America as represented by the Administrator of the National Aeronautics and Space Administration Filed Apr. 19, 1961, Ser. No. 104,188
12 Claims. (Cl. 307—88.5)
(Granted under Title 35, U.S. Code (1952), sec. 266)

Figures 1, 2:
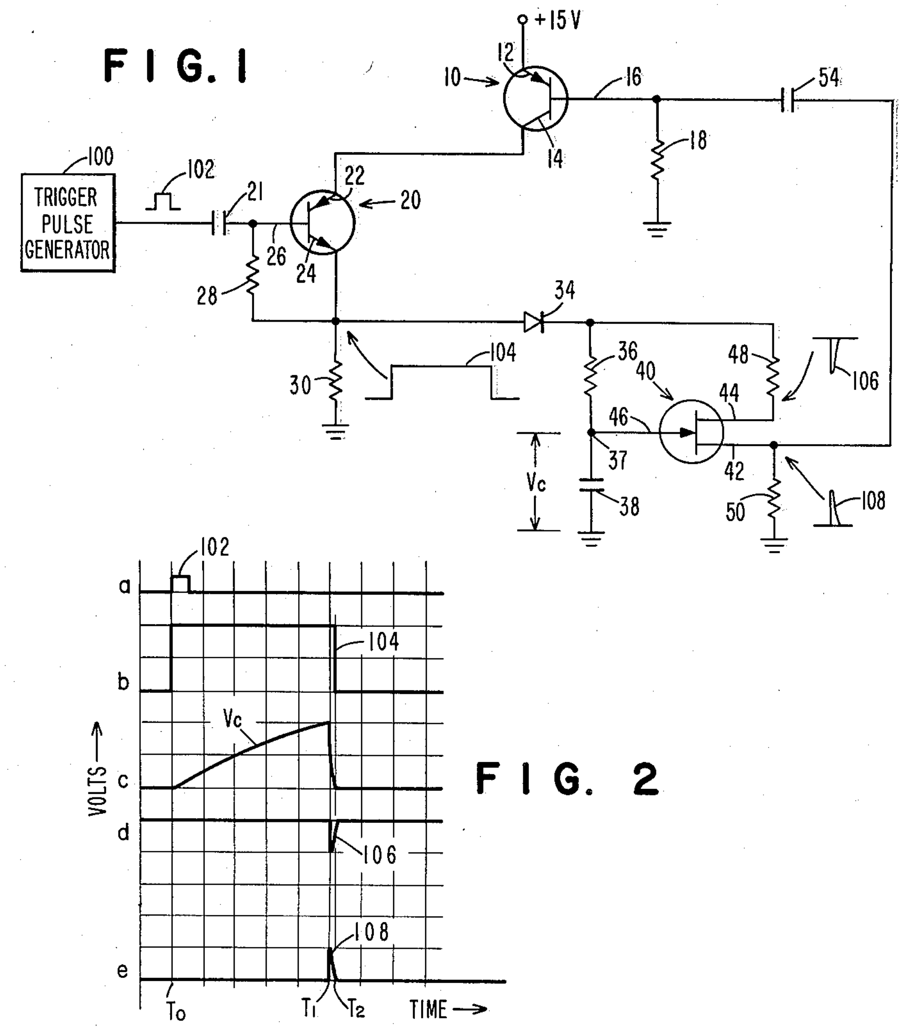

The invention described herein may be manufactured and used by or for the Government of the United States of America for governmental purposes without the payment of any royalties thereon or therefor.

The present invention relates to relaxation oscillator circuits and more particularly to an improved semiconductor monostable multivibrator that generates a long time step function gate with good leading and trailing edges as well as providing a delayed pulse of either polarity.

As is known, triggered circuits operating in a monostable mode have two operating regions of which one, often termed the quiescent operating point, is stable. A trigger pulse applied to the circuit causes the operating point to shift from the stable region to the second region. The operating point then remains in the second region for a period of time which is determined by the time constants associated with the circuit elements. After this period of time the operating point of the circuit relaxes back to the stable state. A monostable multivibrator is an example of such a triggered circuit.

In many applications wherein monostable multivibrators are utilized, the source of power available for circuit operations is severely limited. This has led to the widespread use, in those circuits, of low power drain components such as transistors and other semiconductor elements. Conventional transistor monostable multivibrators that operate as noted above, usually contain two transistors, one of which is always turned "on," i.e., in a high conduction state. Therefore, even in the quiescent operating point there is a noticeable drain on the power supply. In applications where the power supply is limited, such as in battery powered or even solar power augmented space satellites, the quiescent power drain experienced with conventional circuits is considered intolerable.

Other problems associated with the design of monostable multivibrators which generate long time pulses arise because of the large value of resistance that is used in their timing circuits to achieve a long time delay. For example, for values of resistors over 100,000 ohms, ambient temperature variations may change the value of these resistors significantly, not only changing the timing of the circuit but frequently causing the multivibrator to operate in a free running mode. In certain applications this problem may be solved by selecting a higher value of capacitance. However, this solution is often impractical due to space and cost limitations. Furthermore, when long time pulses are to be generated from conventional transistor multivibrator circuits, inherently poor leading and trailing edges of the output gate are obtained.

The general purpose of the present invention is to provide an improved semiconductor monostable multivibrator which embraces all the advantages of similarly employed multivibrators and possesses none of the aforedescribed disadvantages. To obtain this, the invention includes in one embodiment, a circuit arrangement comprising a three terminal PNPN switch which has thyratron-like properties. The PNPN switch, when turned "on" by a trigger pulse, conducts heavily and develops a D.C. voltage across a load resistor. This voltage is applied to a timing circuit comprising a resistor-capacitor charging circuit and a double base diode discharge circuit. The capacitor of this circuit is charged by the D.C. voltage until it reaches the breakdown voltage of the double base diode whereupon the capacitor rapidly discharges through the diode. The discharge of the capacitor is utilized to open the PNPN switch and to remove the generated D.C. voltage from the timing circuit. The output generated by this circuit is obtained across the load resistor in the PNPN circuit. Delayed output pulses of either polarity may also be obtained from the described circuit. As the semiconductor devices in the circuit are initially not drawing any appreciable current, the quiescent power drain is essentially zero. The invention embodied in the described circuit also allows high values of resistance to be selected for the timing circuit in order to obtain long time constants without resulting in a free running mode of operation.

It is an object of the present invention to provide an improved semiconductor multivibrator circuit.

Another object of the invention is the provision of an improved monostable multivibrator having an ultra long time delay in the quasi-stable operating state.

Still another object of this invention is to provide an improved monostable multivibrator capable of generating a long time pulse having good leading and trailing edge characteristics.

A further object of the invention is the provision of an improved monostable multivibrator circuit capable of producing delayed pulses of either polarity.

Another object of the invention is the provision of an improved monostable multivibrator capable of generating a long time pulse as well as simultaneously producing delayed pulses of either polarity.

A still further object of this invention is to provide a time delay circuit having improved operating characteristics over a wide range of ambient temperature conditions.

Yet another object of the invention is an improved multivibrator especially suitable for low power application, such as required in space satellites.

A further object of the present invention is the provision of an improved monostable multivibrator with essentially zero quiescent power drain.

It is still a further object of the present invention to provide a triggered circuit which generates a long time pulse when triggered by an incoming signal and which rapidly resets itself after generating this pulse.

Other objects and advantages of the invention will hereinafter become fully apparent from the following description of the annexed drawings which illustrate a preferred embodiment and wherein FIG. 1 is a schematic showing of one monostable multivibrator embodying the principles of this invention.

Figure 3:
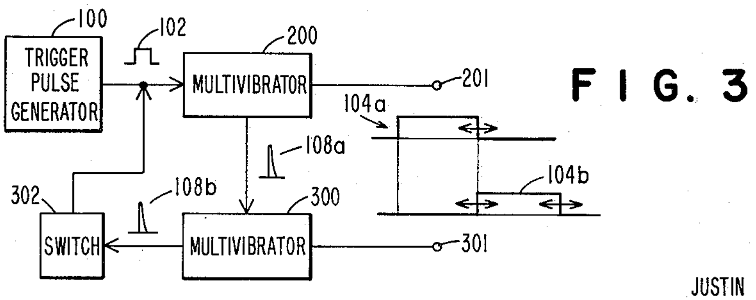

FIG. 2 is a graph illustrating the voltages at various points in the circuit of FIG. 1; and FIG. 3 is a block diagram of one possible interconnection of two monostable multivibrators of the type described in FIG. 1.

Referring now to FIG. 1, a circuit arrangement incorporating principles of the invention is illustrated as including a trigger pulse generator 100 for producing a pulse 102 which is applied to the gate electrode 26 of semiconductor element 20 through a coupling capacitor 21. Element 20 may be any semiconductor which exhibits thyratron-like properties, in that it can be converted from a first state of no current flow to a second state of high current flow by a control signal of small amplitude and duration.

Semiconductor element 20, for example, may be a three terminal PNPN switch having electrodes located at the end P, middle P, and the end N regions. This switch blocks current flow when the end N region is positive with respect to the end P region. If the end P region is positive with respect to the end N region, current is also blocked until a control signal is applied between the middle P region and the end N region. Upon the application of a control signal to the middle P region the switch is placed in a conducting state. As is typical thyratron operation, conduction can be stopped by reducing the potential applied to the switch below a critical value. In FIG. 1, semiconductor element 20 is symbolically illustrated wherein the end P region is the anode electrode 22, the end N region is the cathode electrode 24, and the middle P region is the gate electrode 26.

While only so much of the operation as is necessary to an understanding of the invention has been set forth, further explanation of the operation of a PNPN switch of the type described above can be found in an article entitled "The Medium Power Silicon Controlled Rectifier" by D. K. Bison, pages 166 to 171 of the 1958 IRE Wescon Convention Record, Part III, Electron Devices, or in the Proceedings of the IRE, Volume 46, page 1236 to 1239, June 1958, in an article entitled "Multiterminal PNPN Switches." It will be understood that semiconductor element 20 need not be of the specific type aforementioned, but may be any semiconductor element which exhibits thyratron-like properties.

The anode electrode 22 of element 20 is connected to a positive supply voltage through the transistor 10. Transistor 10 has its emitter 12 connected to a positive supply voltage and its collector 14 connected to the anode electrode 22 of element 20. A bias resistor 18 is connected between the base 16 of transistor 10 and ground or to the negative terminal of the supply source. The external circuit of semiconductor element 20 is completed by a load resistor 30 connected to the cathode electrode 24 and a resistor 28 located between the cathode electrode 24 and the gate electrode 26. A positive voltage shown as 104 in FIG. 1 is obtained across load resistor 30 when the switch 20 is turned "on" to conduct current heavily. This voltage is applied to a timing circuit which comprises a resistor 36 and capacitor 38 charging circuit, and a double base diode or unijunction transistor 40 voltage controlled discharge circuit. A diode 34 having its anode connected to the cathode electrode 24 of semiconductor element 20 and its cathode connected to the resistor 36 is provided to insure that the current flow will be only in the desired direction.

The double base diode or unijunction transistor 40 may consist of a bar of semiconducting material which has base electrodes 42, 44 affixed to either end of the bar. A rectifying junction region having an electrode 46 is formed by any suitable process at one face of the semiconductor bar between the two electrodes. The region between junction electrode 46 and the electrode 42 is generally referred to as the "base-one" region and that between electrode 46 and electrode 44 as the "base-two" region.

The bar may consist of an N-type material such as germanium, silicon or the like and a P-type pellet or dot, which may be of indium or other suitable material, fused or otherwise formed on the bar to produce a broad area PN rectifying junction. The operation of such a double base diode is well known and will be explained only briefly.

A voltage applied to the two base electrodes establishes a voltage gradient in the bar of N-type semiconductor material. If a voltage is applied to the P material that is less than the voltage gradient of the N material opposite the P material, the PN junction is reversed bias and the only current flowing is the reverse bias current. However, if the voltage applied to the P material is made greater than the voltage gradient opposite P material, the PN junction becomes forward bias and heavy electron current flows in the N-type material and heavy hole current flow occurs in the P-type material.

For a more detailed description of the construction and characteristics of a double base diode which may be utilized in this invention reference should be made to either the "Principles of Transistor Circuits" edited by R. F. Shea and published in 1953 by John Wiley and Sons, Inc., of New York, or "An Introduction to Semiconductors" by W. C. Dunlap, Jr., pages 365 to 367 also published by John Wiley and Sons, Inc.

In FIG. 1 the unijunction transistor or double base diode 40 is symbolically shown as having a base-one electrode 42, a base-two electrode 44 and an emitter electrode 46. The base-two electrode is connected through a bias resistor 48 to the cathode of diode 34 and to the charging resistor 36. The base-one electrode 42 is connected to a load resistor 50 which has its other end grounded and is also connected to the base 16 of transistor 10 through a coupling capacitor 54. The emitter electrode 46 of the double base diode is connected to the junction 37 between the resistor 36 and the capacitor 38 of the charging circuit. The other side of the capacitor 38 is connected to ground or the negative terminal of the power supply.

In operation, transistor 10 is initially biased so that the internal emitter-collector circuit is in a low internal impedance or high conduction condition. Thus, B+ is applied to semiconductor element 20. Although transistor 10 is "on" in the quiescent period, no appreciable current flows therethrough as the load for transistor 10 is the semiconductor element 20 which is initailly nonconducting. However, upon the application of trigger pulse 102 to the gate electrode 26 of the element 20, element 20 begins to and continues to conduct heavily. The voltage developed across the load resistor 30 is applied across the base electrodes of the double base diode 40 and to the resistor-capacitor charging circuit.

The application of this voltage to the timing circuit charges the capacitor 38 until it reaches the breakdown voltage of the double base diode 40. The capacitor 38 then rapidly discharges through the emitter 46 and base-one electrode 42 of the double base diode and the load resistor 50. The timing of the circuit is thus determined by the time it takes the capacitor 38 to charge to the breakdown potential of the double base diode 40.

The positive pulse 108 obtained across the load resistor 50 is coupled to the base 16 of transistor 10 to momentarily bias this transistor open, that is, to place its internal emitter-collector circuit in its high impedance or low conduction condition. This action effectively removes the B+ potential that is applied to the electrode 22 of the element 20 and effectively stops the current flow through this element until a subsequent trigger pulse is applied to electrode 26. The voltage across load resistor 30 is sharply cut off when the element 20 stops conducting which results in a long time pulse 104 being generated across load resistor 30. Delayed output pulses 106 and 108 of either polarity, as shown in FIG. 1, may be derived from the base electrodes of the double base diode 40 when this diode breaks down and the capacitor 38 rapidly discharges therethrough.

One example of circuit components which have proven themselves useful in constructing a specific monostable multivibrator of the type described are as follows:

| | |
|---|---|
| Resistor **18** | 100K. |
| Resistor **28** | 4.7K. |
| Resistor **30** | 4.7K. |
| Resistor **36** | 470K. |
| Resistor **48** | 470 ohms. |
| Resistor **50** | 100 ohms. |
| Capacitor **21** | .001μf. |
| Capacitor **38** | 68μf. |
| Capacitor **54** | .01μf. |
| Transistor **10** | 2N328A. |

| | |
|---|---|
| Transistor 20 | 2N1595 manufactured by Texas Instruments, Inc., or 3A31 manufactured by Solid Products, Inc. |
| Transistor 40 | 2N489 manufactured by General Electric Co. |

A circuit using these components, with a positive supply of 15 volts applied thereto, generates a step function 104 having a length of approximately forty seconds. The circuit, after approximately forty seconds, also generates delayed pulses 106, 108. An accuracy of 8% over a temperature range of plus 60° C. to minus 10° C. is achieved with the above listed components. Of course, it is understood that other temperature compensation can be used for even better accuracy. Obviously, other components or values of resistance, capacitance and the like can be substituted as desired.

One advantage immediately evident in the above described circuit is that the quiescent power drain is essentially zero. Also, because of circuit isolation, high values of resistance may be used in the timing circuit to generate a long time step function gate having good leading and trailing edge characteristics as well as providing delayed pulses of either polarity which may be used, among other applications, for triggering cascade circuits.

FIG. 2 illustrates, by means of a voltage-time diagram, the voltages appearing at particular points in the circuit during its above described operation. Waveform *a* of FIG. 2 shows the trigger pulse 102 that is applied to the electrode 26 of element 20 at the time $T_0$. Waveform *b* shows the voltage 104 that is developed across the load resistor 30 during the time that the element 20 is conducting. This is also the voltage that is applied to the timing circuit to bias the double base diode 40 and to charge the capacitor 38. The voltage $V_c$ appearing across the capacitor 38 is shown by waveform *c*. At time $T_1$ the voltage $V_c$ equals the breakdown voltage of the double base diode 40 and the capacitor 38 discharges through the double base diode. Delayed pulses 106 and 108 illustrated by the waveforms *d* and *e* are obtained at the base electrodes 44, 42 of the double base diode. Pulse 108 is applied to transistor 10 to effectively remove the supply voltage from the element 20, thereby reducing the voltage developed across load resistor 30 to zero at the time $T_2$.

In FIG. 3 there is illustrated one suitable cascade arrangement of two ultra long monostable multivibrators of the type described in FIG. 1. A trigger source 100 applies a pulse 102 to the first multivibrator 200. As discussed above, this multivibrator generates a long time step-function gate **104*a* which may be obtained from its output 201. The length of this step-function is variable and is determined by the timing circuit. A delayed output pulse 108*a* which is also generated by the multivibrator 200 is applied to a multivibrator 300 to trigger this circuit. As the multivibrator 300 is also of the same type as described in FIG. 1, a long time step-function gate 104*b* may be obtained from its output 301. The length of pulse 104*b* also depends on the timing constants of the timing circuit of multivibrator 300 and, of course, may be preselected. A delayed output pulse from multivibrator 300 is then applied to the switch 302. This switch may be of any suitable type, either electronic or mechanical, which operates to pass a signal applied to its input in one state (closed) or to block this transmission in a second state (open). The pulse 108*b* that is applied to switch 302 triggers multivibrator 200 if switch 302 is in the closed state and the cascade circuit of FIG. 3 continues to generate long time step gates at outputs 201 and 301. In addition, as has been described, delayed negative or positive output pulses such as pulses 106 and 108 of FIG. 1 are generated by both multivibrators 200 and 300. If the switch 302 is opened, the application of the delayed output pulse of multivibrator 300 to trigger multivibrator 200 is blocked and only one long time step-function gate 104*a* and 104*b* is generated by each multivibrator for each trigger pulse 102 that is generated by trigger pulse generator 100**.

The above described circuits are intended merely as illustrative embodiments of the invention. Numerous other advantages, applications and modifications of the invention will be apparent to those skilled in the art and are intended to be included within the scope of the invention. For example, particular types of transistors have been indicated in the description, but it is obvious that other types could be employed to produce the same results.

What is claimed is:

1. A triggered circuit for generating an output pulse of a predetermined duration, comprising: a semiconductor switch having a first current blocking state and a second current conducting state, controlled bias supply means for supplying a bias potential to said semiconductor switch, a trigger pulse source for applying a trigger pulse to said semiconductor switch to cause said switch to change from its first current blocking state to its second current conducting state, a timing network connected to said semiconductor switch and to said controlled bias supply means, said timing network being energized by the current flowing through said semiconductor switch and producing a control voltage a predetermined time after being energized, said control voltage being applied to said bias supply means to momentarily remove the application of bias potential from the semiconductor switch whereby said semiconductor switch reverts to its initial current blocking state.

2. The circuit of claim 1, wherein said timing network comprises a resistor-capacitor charging circuit and a voltage controlled discharge circuit for said capacitor whereby said capacitor charges at a rate determined by the time constants of the charging circuit until it reaches a predetermined voltage level and then rapidly discharges through the voltage controlled discharge circuit to generate said control voltage.

3. The circuit of claim 1 further defined in that said timing network comprises a series resistor-capacitor charging circuit, a double base diode having two base electrodes and an emitter electrode, and a resistor connected in series with said base electrodes, said resistor and said base electrodes being connected in parallel with the charging circuit, said emitter electrode being connected to the junction between the resistor and capacitor of the charging circuit whereby said capacitor charges at a rate determined by the time constants of the charging circuit until said capacitor reaches the breakdown voltage of the double base diode and then discharges through the double base diode generating the control voltage that is applied to the controlled bias supply means.

4. A triggered circuit for generating an output pulse of a predetermined duration comprising a transistor switch having an initial current blocking state and a second current conducting state, a bias supply circuit for providing a bias potential to said transistor switch, transistor control means located in said bias supply circuit for momentarily reducing the bias potential supplied to said transistor switch when activated by a control voltage, a trigger pulse source for applying a trigger pulse to said transistor switch to cause said switch to change from its initial current blocking state to its second current conducting state, said output pulse being generated by said transistor switch while it remains in its second state, a timing network energized by the current flowing through said transistor switch when said switch is triggered to its second state for producing a delayed control voltage, said timing network being connected to said transistor control means whereby said control voltage actuates said transistor control means to momentarily remove the bias potential from said transistor switch which reverts said transistor switch back to its initial current blocking state.

5. A monostable multivibrator circuit for generating an output pulse of predetermined duration, said multivibrator comprising a semiconductor element having an anode, cathode, and gate electrodes, said element initially operating in a current blocking state, a bias supply for applying a bias potential to the anode-cathode circuit of the semiconductor element, a load resistor located in the cathode circuit of said element, a pulse source connected to said gate electrode for switching said element from the initial current blocking state to a second current conducting state, said output pulse being generated across said load resistor when said element is in its current conducting state, bias supply control means for momentarily removing the bias potential from the anode-cathode circuit of said semiconductor element when actuated by a control signal, timing means connected to said load resistor and energized by the current flowing through said semiconductor element when said element is in the second current conducting state, said timing means generating a delayed control signal a predetermined time after said semiconductor element is triggered by said pulse source, means connecting said timing means to said bias supply control means whereby the control signal is applied to said bias supply control means to momentarily remove the bias potential from said anode-cathode circuit of said semiconductor element reverting said element to its initial current blocking state.

6. A monostable multivibrator circuit for generating an output pulse of predetermined duration and a delayed pulse of either polarity, comprising, a switch having an anode, cathode and gate electrodes, said switch having an initial operating mode wherein current flow between the anode-cathode electrodes of the switch is blocked and a second operating mode wherein current flows between the anode-cathode electrodes, a bias supply for applying a bias potential to the anode-cathode electrodes of said switch, a load resistor located in the cathode circuit of said switch, said output pulse being generated across said load resistor whenever said switch is in its second operating mode, a pulse source for applying a triggering pulse to the gate electrode of said switch to transfer said switch from its initial operating mode to its second operating mode, a bias control circuit for momentarily removing the bias potential from the anode-cathode electrodes of said switch when actuated by a control pulse, a timing network connected to the load resistor and energized when said switch is in its second operating mode, said timing network comprising a resistor-capacitor charging circuit, a double base diode having a first base electrode, a second base electrode and an emitter electrode, and impedance means connected in series with said first and second base electrodes, said series connected impedance means and base electrodes being connected in parallel with said charging circuit, said emitter electrode of said double base diode being connected to the junction of the resistor and capacitor of the charging circuit whereby said capacitor charges at a rate determined by the time constants of the charging circuit until the voltage of the capacitor reaches the breakdown voltage of the double base diode and then discharges through the double base diode generating a delayed output pulse of either polarity at the base electrodes of the double base diode, and means connecting the output delayed pulse from one of the base electrodes to the bias control circuit for momentarily removing the bias supply from the anode-cathode electrodes of said switch whereby said switch reverts to its initial current blocking operating mode.

7. A transistor monostable multivibrator for generating a pulse of predetermined duration comprising semiconductor switching means having an initial current blocking state and a second current conducting state, means for applying a bias potential to said semiconductor switching means, trigger means connected to said switching means for changing the operating mode of said switching means from the first current blocking state to its second current conducting state, said pulse being generated while said switching means remains in the second current conducting state, timing means energized by the current flowing through said semiconductor switching means, said timing means being connected to said bias potential means for momentarily reducing after a predetermined time the bias potential applied to said switching means thereby reverting said switching means from the second current conducting state to the first current blocking state.

8. A monostable multivibrator for generating a pulse of predetermined duration comprising semiconductor switching means having an initial current blocking state and a second current conducting state, means for applying a bias potential to said semiconductor switching means, control means connected to said bias means for momentarily reducing the bias potential applied to said semiconductor switching means when activated by a control pulse, triggering means connected to said semiconductor switch for changing the operating mode of said semiconductor switching means from its first current blocking state to its second current conducting state, said pulse being generated when said switch is in its second current conducting state, timing means connected to said semiconductor switching means and being energized by said generated pulse for producing a control pulse a predetermined time after being energized, means connecting said timing means to said control means whereby said control pulse is applied to said control means to momentarily reduce the bias potential applied to said semiconductor switching means thereby reverting the switching means from the second current conducting state to the initial current blocking state.

9. A monostable multivibrator for producing a time pulse of predetermined duration and delayed output pulses of either polarity comprising semiconductor switching means having an initial current blocking operating state and a second current conducting operating state, means for applying a bias potential to said semiconductor switching means, control means connected to said bias potential means for momentarily removing the bias potential from said semiconductor switching means when activated by a control pulse, trigger means connected to said semiconductor switching means for changing the operating mode of said semiconductor switching means from its initial operating state to its second operating state, said time pulse being generated while said switch is in its second operating state, timing means actuated by said semiconductor switching means for producing delayed output pulses of either polarity, means connecting said timing means to said control means whereby one of the output delayed pulses is applied as a control pulse to said control means to momentarily reduce the bias potential applied to said semiconductor switching means thereby reverting the switching means from its second operating state to the initial operating state.

10. A timing circuit for producing delayed output pulses of both positive and negative polarity comprising semiconductor switching means having an initial current blocking operating state and a second current conducting operating state, means for applying a bias potential to said semiconductor switching means, triggering means connected to said semiconductor switching means for changing the operating mode of said semiconductor switching means from its initial operating state to the second operating state, timing means energized by said semiconductor switching means while said semiconductor switching means is in its second operating state for producing delayed output pulses of either polarity, said timing means comprising a resistor-capacitor charging circuit and a double base diode having an emitter electrode and base electrodes, a bias resistor and a load resistor connected to said base electrodes of the double base diode, said base electrodes of the double base diode and said bias and load resistors being connected in parallel with said charging circuit, said emitter electrode being connected to the junction between the resistor and capacitor of said charging circuit whereby said capacitor charges when said timing means is energized until the voltage of said capacitor reaches the breakdown voltage of said double base diode and then said capacitor discharges through the emitter electrode of said double base diode and said load resistor, said delayed output pulses being developed at the base electrodes of said double base diode when said discharge occurs.

11. A pulse generating circuit comprising a first and second triggered circuit each producing an output pulse of predetermined duration and a delayed output pulse of either polarity; each of said first and second triggered circuit including a transistor switch having a first current blocking state and a second current conducting state, a controlled bias supply for supplying a bias voltage to said transistor switch, said transistor switch generating said predetermined duration output pulse while said switch is in its current conducting state, a timing network connected to said transistor switch and to said controlled bias supply for producing said delayed output pulses of either polarity a predetermined time after said transistor switch changes from its first current blocking state to its second current conducting state, one of said delayed output pulses being applied to the bias supply to control said bias supply whereby the bias potential applied to said transistor switch is momentarily removed from said transistor switch and said transistor switch reverts to its initial current blocking state; a trigger pulse source for applying a trigger pulse to said first triggered circuit to cause said first triggered circuit to generate a predetermined duration output pulse and said delayed output pulses; said first triggered circuit being connected to said second triggered circuit whereby one of said delayed output pulses is coupled from said first triggered circuit to cause said second triggered circuit to generate a predetermined duration output pulse and said delayed output pulses; switching means connected between said second triggered circuit and said first triggered circuit for controlling the application of one of said delayed output pulses from said second triggered circuit to said first triggered circuit.

12. A monostable multivibrator for generating a pulse of predetermined duration independent of the duration of the pulses triggering said monostable multivibrator comprising a source of bias potential, a semiconductor switch initially nonconducting which conducts current heavily when triggered by an incoming pulse from a pulse trigger source, control transistor means initially in a low impedance high conduction state located between said semiconductor switch and said bias potential source for controlling the application of bias potential from said bias source to said semiconductor switch, timing means energized by the current flowing through said semiconductor switch while said switch conducts heavily for producing a delayed pulse, said timing means being connected to said control transistor means whereby said delayed pulse is applied to said control transistor means to momentarily reduce the current conduction of said control transistor means.

References Cited in the file of this patent

UNITED STATES PATENTS 3,018,392 Jones et al. ............. Jan. 23, 1962